United States Patent
Zalich et al.

(10) Patent No.: US 11,466,159 B2
(45) Date of Patent: Oct. 11, 2022

(54) PARTICLES HAVING SURFACES FUNCTIONALIZED WITH 1,1-DI-ACTIVATED VINYL COMPOUNDS

(71) Applicant: PPG Industries Ohio, Inc., Cleveland, OH (US)

(72) Inventors: Michael A. Zalich, Wexford, PA (US); Aditya Gottumukkala, Monroeville, PA (US); Kurt G. Olson, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 705 days.

(21) Appl. No.: 16/320,637

(22) PCT Filed: Jul. 26, 2017

(86) PCT No.: PCT/US2017/044014
§ 371 (c)(1),
(2) Date: Jan. 25, 2019

(87) PCT Pub. No.: WO2018/022794
PCT Pub. Date: Feb. 1, 2018

(65) Prior Publication Data
US 2019/0161620 A1    May 30, 2019

Related U.S. Application Data

(60) Provisional application No. 62/416,753, filed on Nov. 3, 2016, provisional application No. 62/366,781, filed on Jul. 26, 2016.

(51) Int. Cl.
| | |
|---|---|
| C09C 1/36 | (2006.01) |
| C09C 3/06 | (2006.01) |
| C09D 7/62 | (2018.01) |
| C08K 9/04 | (2006.01) |
| C09C 1/00 | (2006.01) |
| C09C 3/10 | (2006.01) |
| C09C 3/08 | (2006.01) |
| C09D 5/00 | (2006.01) |
| C08K 3/22 | (2006.01) |

(52) U.S. Cl.
CPC .............. *C09C 1/3669* (2013.01); *C08K 9/04* (2013.01); *C09C 1/00* (2013.01); *C09C 1/3661* (2013.01); *C09C 1/3692* (2013.01); *C09C 3/063* (2013.01); *C09C 3/08* (2013.01); *C09C 3/10* (2013.01); *C09D 5/00* (2013.01); *C09D 7/62* (2018.01); *C08K 3/22* (2013.01); *C08K 2003/2237* (2013.01)

(58) Field of Classification Search
None
See application file for complete search history.

(56) References Cited

U.S. PATENT DOCUMENTS

| | | |
|---|---|---|
| 3,197,318 A | 7/1965 | Halpern et al. |
| 3,660,263 A | 5/1972 | Auletta et al. |
| 4,382,109 A | 5/1983 | Olson et al. |
| 4,452,861 A | 6/1984 | Okamoto et al. |
| 4,740,534 A | 4/1988 | Matsuda et al. |
| 4,885,191 A | 12/1989 | Podszun et al. |
| 5,321,112 A | 6/1994 | Olson |
| 5,639,828 A | 6/1997 | Briggs et al. |
| 5,723,275 A | 3/1998 | Wang et al. |
| 6,517,940 B1 | 2/2003 | Millero et al. |
| 7,238,231 B1 * | 7/2007 | Craig ............... C01G 23/07 106/436 |
| 8,609,885 B2 | 11/2013 | Malofsky et al. |
| 8,884,051 B2 | 11/2014 | Malofsky et al. |
| 9,108,914 B1 | 8/2015 | Malofsky et al. |
| 9,181,365 B2 | 11/2015 | Malofsky et al. |
| 9,221,739 B2 | 12/2015 | Malofsky et al. |
| 9,334,430 B1 | 5/2016 | Stevenson et al. |
| 9,416,091 B1 | 8/2016 | Sullivan et al. |
| 9,567,475 B1 | 2/2017 | Palsule et al. |
| 2003/0030170 A1 | 2/2003 | Abe et al. |
| 2003/0042142 A1 | 3/2003 | Yamoto et al. |
| 2005/0171273 A1 | 8/2005 | Ledwidge et al. |
| 2006/0018936 A1 * | 1/2006 | Appel ............... C09D 13/00 424/401 |
| 2014/0124696 A1 * | 5/2014 | Guo ............... A61K 49/1857 252/62.54 |
| 2014/0275419 A1 * | 9/2014 | Ward ............... C08F 222/32 524/879 |

(Continued)

FOREIGN PATENT DOCUMENTS

| | | |
|---|---|---|
| CN | 105879 A | 10/2001 |
| CN | 102796909 A | 11/2012 |

(Continued)

OTHER PUBLICATIONS

International Search Report and Written Opinion for International Patent Application No. PCT/US2017/044010, dated Oct. 30, 2017.

(Continued)

*Primary Examiner* — Ronak C Patel
(74) *Attorney, Agent, or Firm* — K&L Gates LLP

(57) ABSTRACT

Compositions having solid core particles with functionalizing layers over at least a portion of the outer surfaces of the solid core particles are described. The functionalizing layers are formed from a reaction product of a 1,1-di-activated vinyl compound, or a multifunctional form thereof, or a combination thereof.

23 Claims, No Drawings

(56) References Cited

U.S. PATENT DOCUMENTS

| | | |
|---|---|---|
| 2014/0288230 A1 | 9/2014 | Malofsky et al. |
| 2014/0329980 A1 | 11/2014 | Malofsky et al. |
| 2015/0056879 A1 | 2/2015 | Malofsky et al. |
| 2015/0104660 A1* | 4/2015 | Malofsky ............ C09D 11/106 428/522 |
| 2015/0129819 A1* | 5/2015 | Farrand .................. G02F 1/167 252/583 |
| 2015/0361283 A1 | 12/2015 | Malofsky et al. |
| 2016/0068618 A1 | 3/2016 | Sullivan et al. |
| 2018/0094115 A1 | 4/2018 | Martz et al. |
| 2019/0153244 A1 | 5/2019 | Puodziukynaite et al. |
| 2019/0160739 A1 | 5/2019 | Olson et al. |
| 2019/0161637 A1 | 5/2019 | Olson et al. |
| 2019/0161640 A1 | 5/2019 | Gottumukkala et al. |

FOREIGN PATENT DOCUMENTS

| | | |
|---|---|---|
| CN | 103520771 A | 1/2014 |
| CN | 104312246 A | 1/2015 |
| CN | 105536049 A | 5/2016 |
| CN | 105585879 | 5/2016 |
| EP | 0046088 A1 | 2/1982 |
| EP | 0327129 A1 | 8/1989 |
| EP | 0829756 A2 | 3/1998 |
| EP | 3042939 A1 | 7/2016 |
| JP | 2008019350 | 1/2008 |
| JP | 2013100599 | 5/2013 |
| JP | 2014077024 | 5/2014 |
| KR | 20140145084 A | 12/2014 |
| WO | 0032709 A1 | 6/2000 |
| WO | 2008086033 A1 | 7/2008 |
| WO | 2013036347 A1 | 3/2013 |
| WO | 2013059473 A2 | 4/2013 |
| WO | 2013149173 A1 | 10/2013 |
| WO | 2015165808 A1 | 11/2015 |
| WO | 2017210415 A1 | 12/2017 |
| WO | 2018022804 A1 | 2/2018 |
| WO | 2018022810 A1 | 2/2018 |

OTHER PUBLICATIONS

International Search Report and Written Opinion for International Patent Application No. PCT/US2017/043995, dated Nov. 7, 2017.
International Search Report and Written Opinion for International Patent Application No. PCT/US2017/044041, dated Nov. 7, 2017.
International Search Report and Written Opinion for International Patent Application No. PCT/US2017/044001, dated Oct. 30, 2017.
International Search Report and Written Opinion for International Patent Application No. PCT/US2017/044032, dated Nov. 6, 2017.
International Search Report and Written Opinion for International Patent Application No. PCT/US2017/044014, dated Oct. 27, 2017.
International Search Report and Written Opinion for International Patent Application No. PCT/US2017/044005, dated Nov. 3, 2017.
Mitsubishi International Polymertrade Corporation; Triallyl Isocyanurate TAIC Product Description; http://www.micchem.com/trially_isocyanurate.html; Jun. 4, 2019; 6 pages; U.S.

* cited by examiner

PARTICLES HAVING SURFACES FUNCTIONALIZED WITH 1,1-DI-ACTIVATED VINYL COMPOUNDS

BACKGROUND OF THE INVENTION

Solid particles such as metal oxide particles (e.g., titanium dioxide, silicon dioxide, zirconium dioxide, zinc oxide, and aluminum oxide particles) are used in numerous applications. For example, solid particles are used as opacifiers and/or pigments in the coatings industry, as filler material in plastics, and in a variety of applications in personal care products. Titanium dioxide particles are one particular example of solid particles used in numerous applications, including, for example, as an opacifier and/or white-coloring pigment in the coatings industry, as filler material in plastics, and as an ultraviolet sunblock in consumer care products. Titanium dioxide pigments provide efficient scattering of light, including visible and ultraviolet light, and therefore impart whiteness, brightness, and opacity to materials.

In numerous applications, solid particles are dispersed in other media. For example, in coating compositions, solid particles functioning as pigments are dispersed in the film-forming resins and/or in the carrier fluids (e.g., water and/or organic solvents) in which the film-forming resins and other components are also dispersed. Likewise, in plastics and consumer care products, solid particles are dispersed in a continuous phase or otherwise homogeneously mixed with other chemical components. However, solid particles do not necessarily readily mix with and/or disperse in resins, solvents, plastics, or other material. Therefore, it would be advantageous to improve the dispersibility of solid particles in various materials, and also improve the homogeneity and stability of solid particle dispersions.

SUMMARY OF THE INVENTION

A particle composition comprises a solid core particle comprising an outer surface, and a functionalizing layer over at least a portion of the outer surface of the solid core particle. The functionalizing layer comprises a reaction product of a 1,1-di-activated vinyl compound, or a multifunctional form thereof, or a combination thereof.

Also provided is a dispersion comprising a solvent and a particle composition of the particle composition set forth immediately above dispersed in the solvent.

Also provided is a coating composition comprising a solvent, a film-forming resin dispersed in the solvent, and the particle composition set forth immediately above dispersed in the solvent.

Also provided is a process for producing the particle set forth set forth immediately above. The process comprises mixing solid particles in a solvent to form a mixture, adding a 1,1-di-activated vinyl compound, or a multifunctional form thereof, or a combination thereof, to the mixture, and reacting the 1,1-di-activated vinyl compound, or a multifunctional form thereof, or a combination thereof, in the mixture. The reaction forms a functionalizing layer over at least a portion of an outer surface of the solid particles, the functionalizing layer comprising a reaction product of the 1,1-di-activated vinyl compound, or a multifunctional form thereof, or a combination thereof Also provided is an article coated with the coating composition provided in this section, above.

It is understood that the invention described in this specification is not necessarily limited to the examples summarized in this Summary.

DETAILED DESCRIPTION OF THE INVENTION

As used in this specification, particularly in connection with coatings, layers, or films, the terms "on," "onto," "over," and variants thereof (e.g., "applied over," "formed over," "deposited over," "provided over," "located over," and the like), mean applied, formed, deposited, provided, or otherwise located over a surface of a substrate, but not necessarily in contact with the surface of the substrate. For example, a coating layer "applied over" a substrate does not preclude the presence of one or more other coating layers of the same or different composition located between the applied coating layer and the substrate. Likewise, a second coating layer "applied over" a first coating layer does not preclude the presence of one or more other coating layers of the same or different composition located between the applied second coating layer and the applied first coating layer.

As used in this specification, the terms "polymer" and "polymeric" means prepolymers, oligomers, and both homopolymers and copolymers. As used in this specification, "prepolymer" means a polymer precursor capable of further reactions or polymerization by one or more reactive groups to form a higher molecular mass or cross-linked state.

As used in this specification, the term "1,1-di-activated vinyl compound" means a compound comprising a vinyl group having two electron withdrawing groups (EWG) covalently bonded to one of the π-bonded carbons and no substituents covalently bonded to the other π-bonded carbon (i.e., -EWG-C(=CH$_2$)-EWG-), wherein the electron withdrawing groups independently comprise halogen groups, haloalkyl groups, carbonyl-containing groups (e.g., esters, amides, aldehydes, ketones, acyl halides, carboxylic/carboxylate groups), cyano groups, sulfonate groups, ammonium groups, quaternary amine groups, or nitro groups. The term "multifunctional form" means a compound comprising two or more 1,1-di-activated vinyl groups covalently bonded in one molecule. For instance, a dialkyl methylene malonate is an example of a 1,1-di-activated vinyl compound, and a transesterification adduct of a dialkyl methylene malonate and a polyol is an example of a multifunctional form of a dialkyl methylene malonate.

The invention described in this specification generally relates to compositions comprising functionalized solid particles. The invention described in this specification also relates to dispersions, coating compositions, plastic articles, and other products comprising functionalized solid particles. As provided in further detail below, articles contemplated for use with the functionalized solid particles, dispersions, and coating compositions set forth herein include free-standing structures and mobile entities. Some free-standing articles contemplated as end-use products include metallic cans, industrial components, buildings, bridges, packages, devices or furniture. The mobile entities contemplated as end-use products include automobiles, airplanes, trains, ships, boats or submersibles. The invention described in this specification also relates to processes for producing functionalized solid particles. The functionalized solid particles may exhibit improved dispersibility in solvents, resins (including film-forming resins and plastics), and other materials. Dispersions comprising the functionalized solid particles may exhibit improved homogeneity and stability.

More specifically, the present invention is directed to the surface treatment of solid particles with a 1,1-di-activated vinyl compound, or a multifunctional form thereof, or a combination thereof, to form a functionalizing layer over at least a portion of the outer surfaces of the solid particles. As used in this specification, the term "functionalize" and variants thereof, when referring to surface treatments of and surface layers over solid particles, means the bonding of overlying organic compounds to underlying solid particles through reactions between functional groups in the organic compounds and surface functional groups on the solid particles. Not being bound to any theory, such bonding may include chemical bonding, such as ionic, covalent, coordinate-covalent, hydrogen bonding and/or physical bonding such as sorption or combination of any thereof.

The solid particles can comprise any solid material in particulate form under ambient conditions, such as, for example, oxides, sulfides, sulfates, selenides, arsenides, cyanides, cyanates, halides, carbonates, hydroxides, nitrates, or nitrides of transition elements and p-block elements, including coordination complexes and/or organometallic complexes of transition elements and p-block elements. Examples include, but are not limited to, such compounds of copper, aluminum, cobalt, manganese, iron, cadmium, arsenic, chromium, lead, titanium, tin, antimony, zinc, barium, indium, or mercury. The solid particles can comprise metal oxide particles, such as, for example, particles comprising titanium dioxide, zirconium dioxide, zinc oxide, silicon dioxide, magnesium oxide, an iron oxide (e.g., iron(III) oxide ($Fe_2O_3$)-based pigments), a chromium oxide (e.g., chromium(III) oxide ($Cr_2O_3$)-based pigments), or particles comprising an aluminum oxide (e.g., alumina ($Al_2O_3$)-based particles), or a combination of any thereof. The solid particles can comprise non-oxide particles or pigments such as, for example, carbon black particles and/or organic pigment particles, including organometallic pigments (e.g., carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, and diketo pyrrolo pyrrole red).

The solid particles can also comprise clay, mica, talc, or zeolites. The solid particles can also comprise metal particles (e.g., aluminum, zinc, copper, silver, gold, platinum, titanium, and the like), or alloy particles (e.g., steel, bronze, and the like). The solid particles can also comprise glass particles (e.g., solid or hollow glass microspheres made of soda-lime glass (A-glass), borosilicate glass (E-glass), and the like). The solid particles can also comprise thermoplastic particles or other polymer particles (e.g., poly(methyl methacrylate), polystyrene, polyamides, polyesters, polyethylene, polypropylene, polyurethanes, polyvinyl chloride, polyvinyl acetate, polyvinyl pyrrolidone, poly(ethylene terephthalate), styrene-acrylonitrile copolymer, an epoxy-based polymer, polyethers, polyamines, polyacids, polycarbonates, or polysiloxanes).

The solid particles can comprise mixtures of different particles, such as, for example, mixtures comprising titanium dioxide particles, zirconium dioxide particles, zinc oxide particles, silicon dioxide particles, magnesium oxide particles, iron oxide particles, chromium oxide particles, or aluminum oxide particles, or combinations of any thereof. The solid particles can comprise mixed metal oxide particles, such as, for example, barium titanate ($BaTiO_3$). The solid particles can also comprise mixed-phase particles—i.e., wherein individual particles comprise two or more discrete oxide phases. Examples of mixed-phase particles include, but are not limited to, titanium dioxide particles comprising an outer coating comprising zirconium dioxide and/or alumina. In such examples, the functionalizing layer is located over at least a portion of the outer surface of the outer coating. In another example, smaller solid particles can decorate the surface of a larger solid particle. For example, nano-scale (e.g., 10-100 nm) titanium dioxide particles can be adsorbed onto, or can be integral surface features of, a larger composite particle comprising a silica core.

Combinations of any of the solid particles described above can also be used.

The 1,1-di-activated vinyl compounds can comprise methylene dicarbonyl compounds, dihalo vinyl compounds, dihaloalkyl disubstituted vinyl compounds, or cyanoacrylate compounds, or multifunctional forms of any thereof, or combinations of any thereof. Examples of 1,1-di-activated vinyl compounds and multifunctional forms thereof that can be used to form functionalizing layers over the solid particles are described in U.S. Pat. Nos. 8,609,885; 8,884,051; 9,108,914; 9,181,365; and 9,221,739, which are incorporated by reference into this specification. Additional examples of 1,1-di-activated vinyl compounds and multifunctional forms thereof that can be used to form functionalizing layers over the solid particles are described in U.S. Publication Nos. 2014/0288230; 2014/0329980; and 2016/0068618, which are incorporated by reference into this specification.

The solid particles can be surface treated with a 1,1-di-activated vinyl compound comprising a methylene malonate. Methylene malonates are compounds having the general formula (I):

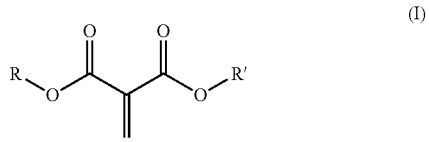

(I)

wherein R and R' can be the same or different and can represent nearly any substituent or side-chain, such as substituted or unsubstituted alkyl or aryl groups. For example, the solid particles can be surface treated with a dialkyl methylene malonate, a diaryl methylene malonate, a multifunctional form of a dialkyl methylene malonate, or a multifunctional form of a diaryl methylene malonate, or a combination of any thereof A multifunctional form of a methylene malonate can comprise a transesterification adduct of the methylene malonate and a polyol. A multifunctional form of a methylene malonate can thus have the general formula (II):

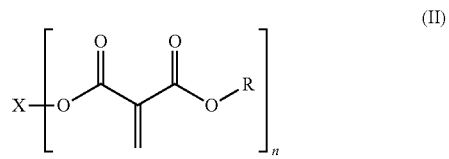

(II)

wherein X is a polyol residue and each R can be the same or different, as described above. As used herein the term "residue" refers to a group derived from the respective compound. For instance, in the above formula, X is an n-valent group derived from a polyol by a transesterification reaction involving methylene malonate and n hydroxyl groups of said polyol. Likewise, a polymer comprising residues of a certain compound is obtained from polymerizing said compound. In some examples, a multifunctional form of a methylene malonate can comprise a transesterification adduct of the methylene malonate and a diol, and thus have the general formula (III):A multifunctional form of a methylene malonate can comprise a transesterification adduct of the methylene malonate and a diol, and thus have the general formula (III):

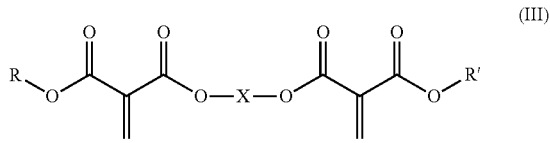

wherein X is a diol residue and R and R' can be the same or different, as described above.

Polyols that are suitable for the production of a transesterification adduct with a methylene malonate include, for example, polymeric polyols (such as polyether polyols, polyester polyols, acrylic polyols, and polycarbonate polyols) and monomeric polyols (such as alkane polyols, including alkane diols such as 1,5-pentanediol and 1,6-hexanediol). The transesterification adduct can be formed by the reaction of a methylene malonate and a polyol, in the presence of a catalyst, in a suitable reaction medium. Examples of transesterification adducts of methylene malonates and polyols that may be used in the coating compositions are described in U.S. Publication No. 2014/0329980 and U.S. Pat. No. 9,416,091, which are incorporated by reference herein. Further, the concentration of the transesterification adduct can be influenced by ratio of the reactants and/or distillation or evaporation of the reaction medium.

The solid particles can be surface treated with dimethyl methylene malonate (D3M), a multifunctional form of D3M, or both. The solid particles can be surface treated with diethyl methylene malonate (DEMM), a multifunctional form of DEMM, or both. The multifunctional forms of D3M or DEMM can comprise transesterification adducts of D3M or DEMM and a polyol, such as, for example, 1,5-pentanediol or 1,6-hexanediol and include, for example, transesterification adducts of D3M and 1,5-pentanediol and/or 1,6-hexanediol as well as transesterification adducts DEMM and and 1,5-pentanediol and/or 1,6-hexanediol and include, for example, transesterification adducts of D3M and 1,5-pentanediol and/or 1,6-hexanediol as well as transesterification adducts DEMM and and 1,5-pentanediol and/or 1,6-hexanediol. The solid particles can be surface treated with a combination of a dialkyl methylene malonate and a multifunctional form of a dialkyl methylene malonate. The solid particles can be surface treated with, for example, DEMM and a multifunctional form of DEMM comprising a transesterification adduct of DEMM and at least one polyol. The DEMM can be transesterified with polyol comprising, for example, an alkane diol such as 1,5-pentanediol or 1,6-hexanediol.

The solid particles can be surface treated with a 1,1-di-activated vinyl compound comprising a transesterification adduct of a methylene malonate and a mono-functional alcohol. Such 1,1-di-activated vinyl compound can function as a surfactant-like molecule having a "head" portion derived from the methylene malonate and a "tail" portion derived from the mono-functional alcohol. Such 1,1-di-activated vinyl compound can be produced by transesterifying a methylene malonate compound (e.g., D3M or DEMM) with a mono-functional alcohol such as, for example, a fatty alcohol (e.g., lauryl alcohol, stearyl alcohol, oleyl alcohol), an alkanol (e.g., butanols, pentanols, hexanols, and the like), or a mono-hydroxy-functional polymer (e.g., polyoxyethylene monols, polyoxypropylene monols, or polyoxyethylene-polyoxypropylene monols).

The solid particles are surface treated with the 1,1-di-activated vinyl compound, or a multifunctional form thereof, or a combination thereof, to form the functionalizing layer over at least a portion of the outer surfaces of the solid particles. The surface treatment can be performed by a process comprising: mixing the solid particles in a solvent to form a mixture; adding the 1,1-di-activated vinyl compound, or a multifunctional form thereof, or a combination thereof, to the mixture; and reacting the 1,1-di-activated vinyl compound, or multifunctional form thereof, or combination thereof, in the mixture. The reaction forms the functionalizing layer over at least a portion of an outer surface of the solid particles. The functionalizing layer therefore comprises a reaction product of the 1,1-di-activated vinyl compound, or a multifunctional form thereof, or a combination thereof.

The solid particles, solvent, and 1,1-di-activated vinyl compound, or multifunctional form thereof, or combination thereof, can be mixed using stirring, milling, or grinding techniques known in the art, including, for example, pot milling, high speed dispersing (cow's blade), Lau dispersing, horizontal dispersing, and the like.

While not intending to be bound by any theory, it is believed that the 1,1-di-activated vinyl compounds and/or the multifunctional forms thereof undergo (1) self-polymerization reactions and/or (2) reactions that form covalent bonds between the solid particles and the 1,1-di-activated vinyl compounds and/or multifunctional forms thereof. For example, the vinyl groups in the 1,1-di-activated vinyl compounds and/or the multifunctional forms thereof may react with surface functional groups (e.g., hydroxyl groups on the outer surfaces of metal oxide solid particles) to form the covalent bonds. The vinyl groups in the 1,1-di-activated vinyl compounds and/or the multifunctional forms thereof may participate in a Michael addition reaction with surface functional groups (e.g., hydroxyl groups on the outer surfaces of metal oxide solid particles) to form the covalent bonds. The 1,1-di-activated vinyl compounds and/or multifunctional forms thereof may undergo polymerization reactions and the resulting reaction product may physically and/or chemically adsorb onto the surface of the solid particles.

A base activator compound and/or an acid promotor compound can also be added to the mixture comprising the solid particles, solvent, and 1,1-di-activated vinyl compound, or multifunctional form thereof, or combination thereof.

As used in this specification, the term "activator" means a compound or other agent capable of initiating and/or catalyzing (i) polymerization of 1,1-di-activated vinyl compounds or multifunctional forms thereof and/or (ii) addition reactions between 1,1-di-activated vinyl compounds or multifunctional forms thereof and particle surface functional groups (e.g., hydroxyl groups on the outer surfaces of metal oxide solid particles). The term "activator" includes (1) active forms of activator compounds and (2) latent precursor forms of activator compounds that are capable of conversion from the latent precursor form into the active form (e.g., by exposure to an effective amount of heat, electromagnetic radiation, pressure, or a chemical co-activator).

An activator compound can comprise a base. As used in this specification, the term "base" means an electronegative compound or functional group capable of initiating the anionic polymerization of a 1,1-di-activated vinyl compound. Suitable activator compounds include organic bases (e.g., amine-containing compounds and carboxylate salts), inorganic bases (e.g., hydroxide salts, carbonate salts, and metal oxides), organometallic compounds, and combinations of any thereof. Suitable activator compounds also include polymers comprising pendant and/or terminal amine, carboxylate salt, or other base functionality capable of initiating the anionic polymerization of a 1,1-di-activated vinyl compound.

An activator compound comprises a strong base (pH over 9), a moderate base (pH from 8-9), or a weak base (pH from over 7 to 8), or a combination of any thereof. An activator compound can comprise, for example, sodium acetate; potassium acetate; acid salts of sodium, potassium, lithium, copper, or cobalt; tetrabutyl ammonium fluoride, chloride, or hydroxide; an amine, including primary, secondary, and tertiary amines; an amide; salts of polymer bound acids; benzoate salts; 2,4-pentanedionate salts; sorbate salts; propionate salts; secondary aliphatic amines; piperidene, piperazine, N-methylpiperazine, dibutylamine, morpholine, diethylamine, pyridine, triethylamine, tripropylamine, triethylenediamine, N,N-dimethylpiperazine, butylamine, pentylamine, hexylamine, heptylamine, nonylamine, decylamine; 1,4-diazabicyclo[2.2.2]octane (DABCO); 1,1'-iminobis-2-propanol (DTPA); 1,2-cyclohexanediamine; 1,3-cyclohexandimethanamine; 2-methylpentamethylenediamine; 3,3-iminodipropylamine; triacetone diamine (TAD); salts of amines with organic monocarboxylic acids; piperidine acetate; metal salt of a lower monocarboxylic acid; copper(II) acetate, cupric acetate monohydrate, zinc acetate, zinc chloracetate, magnesium chloracetate, magnesium acetate; salts of acid containing polymers; salts of polyacrylic acid co-polymers; and combinations of any thereof An activator compound can comprise a tertiary amine such as, for example, DABCO; 2-(dimethylamino)ethanol (DMAE/DMEA); 2-piperazin-1-ylethylamine; N,N,N',N'-tetrakis(2-hydroxypropyl)ethylenediamine; 2[2-(dimethylamino)ethoxy]ethanol; 1-[bis[3-(dimethylamino)propyl]amino]-2-propanol; N,N,N',N'',N''-pentamethyldiethylenetriamine; N,N,N',N'-tetraethyl-1,3-propanediamine; N,N,N',N'-tetramethyl-1,4-butanediamine; N,N,N',N'-tetramethyl-1,6-hexanediamine; 1,4,8,11-tetramethyl-1,4,8,11-tetraazacyclotetradecane; 1,3,5-trimethylhexahydro-1,3,5-triazine; methyl dicocoamine; 1,8-diazabicycloundec-7-ene (DBU); 1,5-diazabicyclo-[4,3,0]-non-5-ene (DBN); 1,1,3,3-tetramethylguanidine; 1,5,7-triazabicyclo[4.4.0]dec-5-ene; 7-methyl-1,5,7-triazabicyclo[4.4.0]dec-5-ene; or combinations of any thereof. A tertiary amine activator compound can comprises a bicyclic guanidine compound or a substituted derivative thereof, such as, for example, 1,5,7-triazabicyclo[4.4.0]dec-5-ene; or 7-methyl-1,5,7-triazabicyclo[4.4.0]dec-5-ene, or a substituted derivative of either thereof, or a combination of any thereof. Additional examples of activator compounds are described in U.S. Pat. No. 9,181,365, which is incorporated by reference into this specification.

An acid promoter compound can comprise a strong acid. As used in this specification, the term "strong acid" means an acid having a pKa in water at 25° C. of less than −1.3 and, for protic acids, at least one proton (H+) that completely dissociates in dilute aqueous solution. Strong acid promoter compounds that can be added to the reaction mixtures described above include, for example, inorganic strong acids and organic strong acids. Suitable inorganic strong acids include, for example, mineral acids (e.g., hydrochloric acid, perchloric acid, sulfuric acid, and nitric acid) and heteropoly acids (e.g., phosphotungstic acid, phosphomolybdic acid, silicotungstic acid, and silicomolybdic acid). Suitable organic strong acids include, for example, sulfonic acids (e.g., p-toluenesulfonic acid, methanesulfonic acid, and dodecylbenzenesulfonic acid). Combinations of any strong acids (e.g., a mixture of a sulfonic acid and a heteropoly acid) can also be added to the reaction mixtures.

Without intending to be bound by any theory, it is believed that acid promoter compounds may function as Lewis acids in the reaction mixtures and complex to the 1,3-dicarbonyl motif, thereby promoting a Michael addition reaction between surface functional groups and the vinyl groups on the 1,1-di-activated vinyl compound and/or multifunctional form thereof. Accordingly, an acid promoter compound may shift the reactions away from self-polymerization of the 1,1-di-activated vinyl compound and/or multifunctional form thereof and toward Michael addition reactions forming covalent linkages between the solid particles and the 1,1-di-activated vinyl compound and/or multifunctional form thereof.

The solvent in which the solid particles and the 1,1-di-activated vinyl compounds and/or the multifunctional forms thereof are mixed to surface treat the solid particles and form the functionalizing layer can comprise any useful solvent or mixture of solvents, including, for example, water, aqueous solvents comprising water as the primary component, or organic solvents, or combinations of any thereof. Suitable organic solvents include, for example, aromatic hydrocarbons, such as, toluene, xylene; aliphatic hydrocarbons, such as, mineral spirits or hexanes; ketones, such as, acetone, methyl ethyl ketone, methyl isobutyl ketone, methyl amyl ketone, and diisobutyl ketone; esters, such as, ethyl acetate, n-butyl acetate, isobutyl acetate; alcohols, such as neopentyl glycol or tert-butanol; ethers, such as, MTBE, diisopropyl ether, or glycol ethers (e.g., ethylene glycol monobutyl ether or diethylene glycol monobutyl ether); and combinations of any thereof The reaction mixture can comprise from 0.5% to 45% of the solid particles, and from 0.5% to 99% of the 1,1-di-activated vinyl compound, or multifunctional form thereof, or combination thereof, based on the total weight of the reaction mixture, including the solvent.

The process produces a dispersion comprising the solvent and a particle composition dispersed in the solvent. The dispersion can have a solids content comprising 1% to 99%, based on the total weight of the dispersion. The particle composition comprises the solid core particles and the functionalizing layers over at least a portion of the outer surfaces of the solid core particles. The functionalizing layers comprise a reaction product (e.g., a polymerization reaction product and/or an addition reaction product) of the 1,1-di-activated vinyl compound, or a multifunctional form thereof, or a combination thereof. The process can further comprise separating the particle composition comprising the functionalized solid particles from the solvent. The solvent can be evaporated to separate the functionalized solid particles from the solvent. The dispersion can be filtered to separate the functionalized solid particles from the solvent.

The "Addition Reaction product" refers to the adduct formed by the reaction of 1,1'-di-activated vinyl compound and/or multifunctional form thereof with a nucleophile (such as an amine, thiol or alcohol and/or their polymeric form). Without being bound to any theory, this may be the result of an addition of the nucleophile to the conjugate double bond (the Michael Addition Reaction'), or displacing the alcohol of the ester of a 1,1-diactivated vinyl ester with a another alcohol (a trans-esterification reaction), an amine, a thiol and/or a polymeric form of them. For example, the reaction of an amine can result in an amide product and the reaction with a thiol can result in a thioester product. A "polymeric addition product" refers to the product of polymerization reaction, wherein a multitude of reactants react repetitively. Without being bound by any theory, this could be done through a variety of reaction mechanisms, such as anionic polymerization, condensation polymerization, chain growth or radical polymerization. For example, a primary amine can react 1,1'-diethyl methylene malonate (DEMM) via anionic polymerization to form polymeric-DEMM.

The present invention also includes coating compositions comprising the functionalized solid particle composition described above. The coating compositions can comprise a solvent, a film-forming resin dispersed in the solvent, and a particle composition comprising the solid core particles and the functionalizing layers over at least a portion of the outer surfaces of the solid core particles, as described above. The coating compositions can comprise from 1% to 65% of the functionalized solid particles, and from 30% to 90% of the film-forming resin, based on the total solids weight of the coating compositions.

The solvent can comprise, for example, any of the solvents described above or mixtures thereof. The film-forming resin can comprise any film-forming resin that can be formulated with pigments or other solid particles. The film-forming resin can comprise an epoxy polymer (e.g., a bisphenol A-based epoxy polymer), acrylic polymer, polyurethane polymer, polyurea polymer, polyester polymer, polyether polymer, polythioether polymer, polyamide polymer, polycarbonate polymer, polycarbamate polymer, polysiloxane polymer, phenolic resin, or aminoplast resin, or a combination of any thereof.

The polymers and resins described above can be organic solvent borne, water soluble, or water dispersible, or emulsifiable in water. Furthermore, the polymers can be provided in sol-gel systems or in core-shell polymer systems. The polymers can be dispersed in a continuous phase comprising water and/or organic solvent, for example, emulsion polymers in water, aqueous dispersions, or non-aqueous dispersions. The coating compositions may not comprise any liquid solvent and can be provided in powder coating form. Such powder coating compositions can comprise the functionalized solid particles dispersed in larger solid-state resin particles that form a free-flowing powder. The coating compositions may not comprise any liquid solvent and can be provided in a 100% solids form. Such solvent-less coating compositions can comprise the functionalized solid particles dispersed in liquid-state resins, with or without reactive diluents.

The coating compositions can comprise thermosetting or curable coating compositions. Thermosetting or curable coating compositions typically comprise film-forming polymers or resins having functional groups that are reactive with either themselves or a crosslinking agent. The film-forming resin can comprise a polymeric film-forming resin comprising pendant and/or terminal functional groups comprising carboxylic acid groups, amine groups, epoxide groups, hydroxyl groups, silanol groups, silicon-hydride groups, thiol groups, carbamate groups, amide groups, urea groups, or isocyanate groups (blocked or unblocked), or a combination of any thereof Thermosetting coating compositions comprising the functionalized solid particles and the film-forming resin can also comprise a poly-functional crosslinking agent (i.e., having two or more functional groups per molecule). The crosslinking agent can comprise aminoplast resins, polyisocyanates (including blocked and unblocked isocyanates), polyepoxides, beta-hydroxyalkylamides, polyacids, anhydrides, organometallic acid-functional materials, polyamines, polyamides, and combinations of any thereof. Suitable polyisocyanates include, for example, aliphatic diisocyanates like hexamethylene diisocyanate and isophorone diisocyanate, and aromatic diisocyanates like toluene diisocyanate and 4,4'-diphenylmethane diisocyanate. Examples of other suitable polyisocyanates include isocyanurate trimers, allophanates, and uretdiones of diisocyanates. Examples of commercially available polyisocyanates include DESMODUR N3390, which is sold by Covestro, LLC, and TOLONATE HDT90, which is sold by Rhodia Inc. Suitable aminoplast resins include condensates of amines and/or amides with aldehydes. For example, a condensate of melamine with formaldehyde, and derivatives thereof, are suitable aminoplast resins. Other suitable aminoplast resins include, for example, the resins described in U.S. Pat. No. 6,316,119 at column 5, lines 45-55, which is incorporated by reference into this specification. The film-forming resin can be self-crosslinking. Self-crosslinking means that the resin contains functional groups that are capable of reacting with themselves, such as alkoxysilane groups, or that the polymer comprising the resin contain functional groups that are co-reactive, for example hydroxyl groups and blocked isocyanate groups.

In addition to the film-forming resin and the functionalized solid particles, the coating compositions, and cured coatings formed therefrom, can include additional components conventionally added to coating compositions, such as plasticizers, anti-oxidants, hindered amine light stabilizers, UV light absorbers and stabilizers, surfactants, flow and surface control agents, thixotropic agents, defoamers, solvents and co-solvents, reactive diluents, catalysts, reaction inhibitors, non-functionalized solid particles (e.g., pigments, fillers, and the like), and other customary auxiliaries in the paint and coating industry, such as colorants.

As used herein, "colorant" means any substance that imparts color and/or other opacity and/or other visual effect to the coating composition, particularly when applied over a substrate and cured. A colorant can be added to the coating composition in any suitable form, such as discrete particles, dispersions, solutions, and/or flakes, and can be functionalized, as described above. A single colorant or a mixture of two or more colorants can be used in the coatings compositions described in this specification.

Example colorants include pigments (organic or inorganic), dyes, and tints, such as those used in the paint industry and/or listed by the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coating by use of a grind vehicle, such as an acrylic grind vehicle, the use of which will be familiar to persons skilled in the art.

Example pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures of any thereof. The terms "pigment" and "colored filler" can be used interchangeably. Example dyes include, but are not limited to, those that are solvent and/or aqueous based such as phthalo green or blue, iron oxide, bismuth vanadate, anthraquinone, perylene, and quinacridone.

Example tints include, but are not limited to, pigments dispersed in water-based or water miscible carriers such as AQUA-CHEM 896 (available from Degussa, Inc.), and CHARISMA COLORANTS and MAXITONER INDUSTRIAL COLORANTS (available from the Accurate Dispersions Division of Eastman Chemical Company).

A colorant optionally formulated in the coating compositions can also comprise a special effect composition or pigment. As used herein, a "special effect composition or pigment" means a composition or pigment that interacts with visible light to provide an appearance effect other than, or in addition to, a continuous unchanging color. Example special effect compositions and pigments include those that produce one or more appearance effects such as reflectance, pearlescence, metallic sheen, texture, phosphorescence, fluorescence, photochromism, photosensitivity, thermochromism, goniochromism, and/or color-change. Examples of special effect compositions can include transparent coated mica and/or synthetic mica, coated silica, coated alumina, aluminum flakes, a transparent liquid crystal pigment, a liquid crystal coating, and combinations of any thereof The functionalized solid particles can be used as pigments in coating compositions (e.g., $TiO_2$-based whitening/opacifying pigments comprising functionalizing layers over at least a portion of the outer surface of the pigments particles, the functionalizing layer comprising a reaction product of a 1,1-di-activated vinyl compound, or a multifunctional form thereof, or a combination thereof). The functionalized solid particles can be used to modify the mechanical properties of cured coatings (e.g., to provide abrasion resistance).

The coating compositions comprising the functionalized solid particles can be used in single-layer or multiple-layer coating systems. The coating compositions comprising the functionalized solid particles can be used in primer coating, basecoat, tiecoat, or topcoat formulations, or any combination of these coating formulations. As used in this specification, a "primer coating layer" means an undercoating that may be deposited onto a substrate in order to prepare the surface for application of a protective or decorative coating system. As used in this specification, the term "basecoat" means a coating layer that is deposited onto a primer and/or directly onto a substrate, optionally including components (such as pigments or other particles, including functionalized particles) that impact the color and/or provide other visual impact. As used in this specification, the term "topcoat" means a coating layer that is deposited over another coating layer such as a basecoat. Topcoats are often, but not always, "clearcoats," which as used in this specification means a coating layer that is at least substantially transparent or fully transparent to visible light. As used in this specification, the term "substantially transparent" refers to a coating wherein a surface beyond the coating is at least partially visible to the naked eye when viewed through the coating. As used in this specification, the term "fully transparent" refers to a coating wherein a surface beyond the coating is completely visible to the naked eye when viewed through the coating. It is appreciated that a clearcoat can comprise colorants, such as pigments, provided that the colorants do not interfere with the desired transparency of the clearcoat layer. As used in this specification, the term "tiecoat" means a coating layer that is located between two other coating layers, such as, for example, a coating layer located between a basecoat layer and a topcoat layer.

The present invention further includes an article comprising a coating formed from a coating composition comprising the functionalized solid particles described in this specification. For example, the coating compositions can be applied to a wide range of substrates including vehicle components and components of free-standing structures such as buildings, bridges, or other civil infrastructures. More specific substrates include, but are not limited to, automotive substrates (e.g., body panels and other parts and components), industrial substrates, aircraft components, watercraft components, packaging substrates (e.g., food and beverage cans), wood flooring and furniture, apparel, electronics (e.g., housings and circuit boards), glass and transparencies, sports equipment (e.g., golf balls, and the like), appliances (e.g., dish washing machines, clothes washing machines, clothes drying machines). Substrates can be, for example, metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, polycarbonate acrylobutadiene styrene (PC/ABS), polyamide, wood, veneer, wood composite, particle board, fiberboard, cement, concrete, brick, stone, paper, cardboard, textiles, leather (both synthetic and natural), glass or fiberglass composites, carbon fiber composites, mixed fiber (e.g., fiberglass and carbon fiber) composites, and the like. The substrate can be one that has been already treated in some manner, such as to impart visual and/or color effect, a protective pretreatment or primer coating layer, or other coating layer, and the like.

The coating compositions can be used as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is a metal can. The term "metal can" includes any type of metal can, container, or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including easy open ends, which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like. The coating can be applied to the interior and/or the exterior of the package.

In some examples, the coating compositions prepared and used according to the present invention may be substantially free, may be essentially free, and/or may be completely free of bisphenol A and epoxy compounds derived from bisphenol A ("BPA"), such as bisphenol A diglycidyl ether ("BADGE"). The term "substantially free" as used in this context means the coatings compositions contain less than 1000 parts per million (ppm), "essentially free" means less than 100 ppm, and "completely free" means less than 20 parts per billion (ppb) of any of the above mentioned compounds, derivatives, or residues thereof Additionally, the functionalized solid particles can be used as pigments and/or fillers in thermoplastic and/or thermoset plastic bulk articles. The functionalized solid particles can be dispersed uniformly or non-uniformly in a matrix of the thermoplastic or thermoset plastic bulk material. The functionalized solid particles can typically comprise from 0.01% to 20% by weight of the total combined weight of the thermoplastic and/or thermoset plastic and the functionalized solid particles, or any sub-range subsumed therein, such as, for example, from 0.05% to 5% or from 0.1% to 2%.

Suitable bulk thermoplastic materials in which the functionalized solid particles can be dispersed include polyethylene, polypropylene, polystyrene, polymethylmethacrylate, polycarbonate, polyvinylchloride, polyethylene-terephthalate, acrylonitrile-butadiene-styrene, polyvinylbutyral, polyvinylacetate, and the like. The plastic material in which the functionalized solid particles can be dispersed include thermoset plastics such as polyurethane, melamine, phenolics, acrylics, polyesters, and the like.

The functionalized solid particles described in this specification may exhibit improved dispersibility and dispersion stability and homogeneity in a variety of materials, including solvents, liquid coating resins, solid coating resins, bulk plastics, and the like. The functionalizing layers comprising a reaction product of a 1,1-di-activated vinyl compound, or a multifunctional form thereof, or a combination thereof, allow the chemistry and the hydrophobicity/hydrophilicity of the surfaces of the solid particles to be tuned based on the chemistry of the 1,1-di-activated vinyl compound and/or multifunctional form thereof, which facilitates the stable incorporation of the functionalized solid particles into an increased number of materials.

WORKING EXAMPLES

The following working examples are intended to further describe the invention. It is understood that the invention described in this specification is not necessarily limited to the examples described in this section.

Example 1:

The dispersibility of an inorganic pigment in toluene was qualitatively evaluated with and without a surface layer comprising a 1,1-diactivated vinyl compound reaction product. Duplicate test samples were prepared by mixing 2 grams of Ti Pure R-900 (an alumina-coated rutile titanium dioxide pigment (94 wt % $TiO_2$) commercially available from The Chemours Company TT, LLC) with 10 grams of toluene in a 20 milliliter scintillation vial using a magnetic stir bar on a magnetic stir plate. 1 gram of diethyl methylene malonate (DEMM) was added via dropper to one of the two duplicate test samples. The resulting mixtures were allowed to stir at room temperature for one hour after which time the stirring was discontinued.

It was observed that the DEMM-treated pigment particles dispersed in the toluene faster than the untreated pigment particles. Within approximately three minutes after the stirring was discontinued, the pigment particles in the comparative sample without any added DEMM had settled out of the toluene and settled to the bottom of the scintillation vial. In contrast, the pigment particles in the sample comprising the added DEMM remained homogeneously dispersed in the toluene longer than the untreated pigment particles. Thus, the dispersibility of the DEMM-treated pigment particles was better than otherwise identical pigment particles without DEMM treatment. Without intending to be bound by any theory, it is believed that during the one hour stirring time the DEMM polymerized and/or reacted with surface functional groups on the pigment particles to covalently bind to the particles, thereby forming an organic surface layer on the pigment particles that stabilized the dispersion of the pigment particles in the toluene.

Example 2:

The dispersibility of an inorganic pigment in toluene was qualitatively evaluated with and without a surface layer comprising a 1,1-diactivated vinyl compound reaction product. Duplicate test samples were prepared by mixing 2 grams of Ti Pure R-900 (an alumina-coated rutile titanium dioxide pigment (94 wt % $TiO_2$) commercially available from The Chemours Company TT, LLC) with 10 grams of toluene in a 20 milliliter scintillation vial using a magnetic stir bar on a magnetic stir plate. 1 gram of dimethyl methylene malonate (D3M) was added via dropper to one of the two duplicate test samples. The resulting mixtures were allowed to stir at room temperature for one hour after which time the stirring was discontinued.

It was observed that the D3M-treated pigment particles dispersed in the toluene faster than the untreated pigment particles. Within approximately three minutes after the stirring was discontinued, the pigment particles in the comparative sample without any added D3M had settled out of the toluene and settled to the bottom of the scintillation vial. In contrast, the pigment particles in the sample comprising the added D3M remained homogeneously dispersed in the toluene longer than the untreated pigment particles. Thus, the dispersibility of the D3M-treated pigment particles was better than otherwise identical pigment particles without D3M treatment. Without intending to be bound by any theory, it is believed that during the one hour stirring time the D3M polymerized and/or reacted with surface functional groups on the pigment particles to covalently bind to the particles, thereby forming an organic surface layer on the pigment particles that stabilized the dispersion of the pigment particles in the toluene.

Example 3:

The dispersibility of an inorganic pigment in toluene was qualitatively evaluated with and without a surface layer comprising a 1,1-diactivated vinyl compound reaction product. Duplicate test samples were prepared by mixing 2 grams of TiONA® 595 (an alumina-coated, zirconia-coated, and organic compound-coated rutile titanium dioxide pigment (95 wt % $TiO_2$) commercially available from the National Titanium Dioxide Co. Ltd. (Cristal)) with 10 grams of toluene in a 20 milliliter scintillation vial using a magnetic stir bar on a magnetic stir plate. 1 gram of diethyl methylene malonate (DEMM) was added via dropper to one of the two duplicate test samples. The resulting mixtures were allowed to stir at room temperature for one hour after which time the stirring was discontinued.

It was observed that the DEMM-treated pigment particles dispersed in the toluene faster than the untreated pigment particles. Within approximately three minutes after the stirring was discontinued, the pigment particles in the comparative sample without any added DEMM had precipitated out of the toluene and settled to the bottom of the scintillation vial. In contrast, the pigment particles in the sample comprising the added DEMM remained homogeneously dispersed in the toluene longer than the untreated pigment particles. Thus, the dispersibility of the DEMM-treated pigment particles was better than otherwise identical pigment particles without DEMM treatment. Without intending to be bound by any theory, it is believed that during the one hour stirring time the DEMM polymerized and/or reacted with surface functional groups on the pigment particles to covalently bind to the particles, thereby forming an organic surface layer on the pigment particles that stabilized the dispersion of the pigment particles in the toluene.

Example 4:

The dispersibility of an inorganic pigment in toluene was qualitatively evaluated with and without a surface layer comprising a 1,1-diactivated vinyl compound reaction product. Duplicate test samples were prepared by mixing 2 grams of TiONA® 595 (an alumina-coated, zirconia-coated, and organic compound-coated rutile titanium dioxide pigment (95 wt % $TiO_2$) commercially available from the National Titanium Dioxide Co. Ltd. (Cristal)) with 10 grams of toluene in a 20 milliliter scintillation vial using a magnetic stir bar on a magnetic stir plate. 1 gram of dimethyl methylene malonate (D3M) was added via dropper to one of the two duplicate test samples. The resulting mixtures were allowed to stir at room temperature for one hour after which time the stirring was discontinued.

It was observed that the D3M-treated pigment particles dispersed in the toluene faster than the untreated pigment particles. Within approximately three minutes after the stirring was discontinued, the pigment particles in the comparative sample without any added D3M had precipitated out of the toluene and settled to the bottom of the scintillation vial. In contrast, the pigment particles in the sample comprising the added D3M remained homogeneously dispersed in the toluene longer than the untreated pigment particles. Thus, the dispersibility of the D3M-treated pigment particles was better than otherwise identical pigment particles without D3M treatment. Without intending to be bound by any theory, it is believed that during the one hour stirring time the D3M polymerized and/or reacted with surface functional groups on the pigment particles to covalently bind to the particles, thereby forming an organic surface layer on the pigment particles that stabilized the dispersion of the pigment particles in the toluene.

Example 5:

The dispersibility of an inorganic pigment in toluene was qualitatively evaluated with and without a surface layer comprising a 1,1-diactivated vinyl compound reaction product. Duplicate test samples were prepared by mixing 2 grams of TRONOX® CR-828 (a zirconia-coated and alumina-coated rutile titanium dioxide pigment (95 wt % $TiO_2$) commercially available from Tronox Limited) with 10 grams of toluene in a 20 milliliter scintillation vial using a magnetic stir bar on a magnetic stir plate. 1 gram of diethyl methylene malonate (DEMM) was added via dropper to one of the two duplicate test samples. The resulting mixtures were allowed to stir at room temperature for one hour after which time the stirring was discontinued.

It was observed that the DEMM-treated pigment particles dispersed in the toluene faster than the untreated pigment particles. Within approximately three minutes after the stirring was discontinued, the pigment particles in the comparative sample without any added DEMM had precipitated out of the toluene and settled to the bottom of the scintillation vial. In contrast, the pigment particles in the sample comprising the added DEMM remained homogeneously dispersed in the toluene longer than the untreated pigment particles. Thus, the dispersibility of the DEMM-treated pigment particles was better than otherwise identical pigment particles without DEMM treatment. Without intending to be bound by any theory, it is believed that during the one hour stirring time the DEMM polymerized and/or reacted with surface functional groups on the pigment particles to covalently bind to the particles, thereby forming an organic surface layer on the pigment particles that stabilized the dispersion of the pigment particles in the toluene.

Example 6:

The dispersibility of an inorganic pigment in toluene was qualitatively evaluated with and without a surface layer comprising a 1,1-diactivated vinyl compound reaction product. Duplicate test samples were prepared by mixing 2 grams of TRONOX® CR-828 (a zirconia-coated and alumina-coated rutile titanium dioxide pigment (95 wt % $TiO_2$) commercially available from Tronox Limited) with 10 grams of toluene in a 20 milliliter scintillation vial using a magnetic stir bar on a magnetic stir plate. 1 gram of dimethyl methylene malonate (D3M) was added via dropper to one of the two duplicate test samples. The resulting mixtures were allowed to stir at room temperature for one hour after which time the stirring was discontinued.

It was observed that the D3M-treated pigment particles dispersed in the toluene faster than the untreated pigment particles. Within approximately three minutes after the stirring was discontinued, the pigment particles in the comparative sample without any added D3M had precipitated out of the toluene and settled to the bottom of the scintillation vial. In contrast, the pigment particles in the sample comprising the added D3M remained homogeneously dispersed in the toluene longer than the untreated pigment particles. Thus, the dispersibility of the D3M-treated pigment particles was better than otherwise identical pigment particles without D3M treatment. Without intending to be bound by any theory, it is believed that during the one hour stirring time the D3M polymerized and/or reacted with surface functional groups on the pigment particles to covalently bind to the particles, thereby forming an organic surface layer on the pigment particles that stabilized the dispersion of the pigment particles in the toluene.

Example 7:

The dispersibility of an inorganic pigment in toluene was qualitatively evaluated with and without a surface layer comprising a 1,1-diactivated vinyl compound reaction product. Duplicate test samples were prepared by mixing 2 grams of TiONA® 596 (an alumina-coated, zirconia-coated, and organic compound-coated rutile titanium dioxide pigment (94 wt % $TiO_2$) commercially available from the National Titanium Dioxide Co. Ltd. (Cristal)) with 10 grams of toluene in a 20 milliliter scintillation vial using a magnetic stir bar on a magnetic stir plate. 1 gram of diethyl methylene malonate (DEMM) was added via dropper to one of the two duplicate test samples. The resulting mixtures were allowed to stir at room temperature for one hour after which time the stirring was discontinued.

It was observed that the DEMM-treated pigment particles dispersed in the toluene faster than the untreated pigment particles. Within approximately three minutes after the stirring was discontinued, the pigment particles in the comparative sample without any added DEMM had precipitated out of the toluene and settled to the bottom of the scintillation vial. In contrast, the pigment particles in the sample comprising the added DEMM remained homogeneously dispersed in the toluene longer than the untreated pigment particles. Thus, the dispersibility of the DEMM-treated pigment particles was better than otherwise identical pigment particles without DEMM treatment. Without intending to be bound by any theory, it is believed that during the one hour stirring time the DEMM polymerized and/or reacted with surface functional groups on the pigment particles to covalently bind to the particles, thereby forming an organic surface layer on the pigment particles that stabilized the dispersion of the pigment particles in the toluene.

ASPECTS OF THE INVENTION

Aspects of the invention include, but are not limited to, the following numbered clauses.

1. A particle composition comprising:
    an solid core particle comprising an outer surface; and
    a functionalizing layer over at least a portion of the outer surface of the solid core particle;
    wherein the functionalizing layer comprises a reaction product of a 1,1-di-activated vinyl compound, or a multifunctional form thereof, or a combination thereof.

2. The particle composition of clause 1, wherein the functionalizing layer comprises:
    a bond between the solid core particle and the 1,1-di-activated vinyl compound, or multifunctional form thereof, or combination thereof; and/or
    a polymerization reaction product of the 1,1-di-activated vinyl compound, or multifunctional form thereof, or combination thereof, physically and/or chemically adsorbed onto the surface of the solid core particle.

3. The particle composition of clause 1 or clause 2, wherein the solid core particle comprises clay, mica, talc, a zeolite, carbon black, or an oxide, sulfide, sulfate, selenide, arsenide, cyanide, cyanate, halide, carbonate, hydroxide, nitrate, nitride, coordination complex, or organometallic complex of a transition element or p-block element, or a combination of any thereof.

4. The particle composition of clause 3, wherein the solid core particle comprises an oxide, sulfide, sulfate, selenide, arsenide, cyanide, cyanate, halide, carbonate, hydroxide, nitrate, nitride, coordination complex, or organometallic complex of an element comprising copper, aluminum, cobalt, manganese, iron, cadmium, arsenic, chromium, lead, titanium, tin, antimony, zinc, barium, indium, or mercury, or a combination of any thereof.

5. The particle composition of any one of clauses 1-4, wherein the solid core particle comprises a metal oxide particle.

6. The particle composition of any one of clauses 1-5, wherein the solid core particle comprises titanium dioxide, zirconium dioxide, zinc oxide, magnesium oxide, an iron oxide, a chromium oxide, or an aluminum oxide, or a combination of any thereof.

7. The particle composition of any one of clauses 1-6, wherein the solid core particle comprises titanium dioxide.

8. The particle composition of any one of clauses 1-7, wherein the solid core particle comprises a titanium dioxide particle comprising an outer coating comprising zirconium dioxide and/or an aluminum oxide, and wherein the functionalizing layer is located over at least a portion of the outer surface of the outer coating.

9. The particle composition of any one of clauses 1-8, wherein the solid core particle comprises a metal particle, an alloy particle, a glass particle, or a thermoplastic particle.

10. The particle composition of any one of clauses 1-9, wherein the solid core particle comprises an organic pigment particle.

11. The particle composition of any one of clauses 1-10, wherein the 1,1-di-activated vinyl compound comprises a methylene dicarbonyl compound, a dihalo vinyl compound, a dihaloalkyl disubstituted vinyl compound, or a cyanoacrylate compound, or a multifunctional form of any thereof, or a combination of any thereof.

12. The particle composition of any one of clauses 1-11, wherein the 1,1-di-activated vinyl compound comprises:

a dialkyl methylene malonate;
a diaryl methylene malonate;
a multifunctional form of a dialkyl methylene malonate; or
a multifunctional form of a diaryl methylene malonate; or
a combination of any thereof.

13. The particle composition of any one of clauses 1-12, wherein the 1,1-di-activated vinyl compound comprises:
diethyl methylene malonate;
a multifunctional form of diethyl methylene malonate comprising a transesterification adduct of diethyl methylene malonate and at least one polyol;
dimethyl methylene malonate; or
a multifunctional form of dimethyl methylene malonate comprising a transesterification adduct of dimethyl methylene malonate and at least one polyol; or
a combination of any thereof.

14. The particle composition of any one of clauses 1-13, wherein the 1,1-di-activated vinyl compound comprises a transesterification adduct of diethyl methylene malonate and a diol.

15. The particle composition of clause 14, wherein the diol comprises an alkane diol.

16. The particle composition of clause 15, wherein the alkane diol comprises 1,5-pentane diol and/or 1,6-hexanediol.

17. A dispersion comprising:
a solvent; and
the particle composition of any one of clauses 1-16 dispersed in the solvent.

18. The dispersion of clause 17, wherein the solvent comprises an organic solvent.

19. The dispersion of clause 17 or clause 18, wherein the solvent comprises water.

20. A coating composition comprising:
a solvent
a film-forming resin dispersed in the solvent; and
the particle composition of any one of clauses 1-16 dispersed in the solvent.

21. The coating composition of clause 20, wherein the solvent comprises an organic solvent.

22. The coating composition of clause 20 or clause 21, wherein the solvent comprises water.

23. The coating composition of any one of clauses 20-22, wherein the film-forming resin comprises an epoxy polymer, acrylic polymer, polyurethane polymer, polyurea polymer, polyester polymer, polyether polymer, polythioether polymer, polyamide polymer, polycarbonate polymer, polycarbamate polymer, polysiloxane polymer, phenolic resin, or aminoplast resin, or a combination of any thereof.

24. The coating composition of any one of clauses 20-23, wherein the film-forming resin comprises a polymeric film-forming resin comprising pendant and/or terminal functional groups comprising carboxylic acid groups, amine groups, epoxide groups, hydroxyl groups, silanol groups, silicon-hydride groups, thiol groups, carbamate groups, amide groups, urea groups, or isocyanate groups (blocked or unblocked), or a combination of any thereof 25. A process for producing the particle composition of any one of clauses 1-16, the process comprising:
mixing solid particles in a solvent to form a mixture;
adding a 1,1-di-activated vinyl compound, or a multifunctional form thereof, or a combination thereof, to the mixture; and
reacting the 1,1-di-activated vinyl compound, or a multifunctional form thereof, or a combination thereof, in the mixture;
wherein the reaction forms a functionalizing layer over at least a portion of an outer surface of the solid particles, the functionalizing layer comprising a reaction product of the 1,1-di-activated vinyl compound, or a multifunctional form thereof, or a combination thereof.

26. The process of clause 25, wherein the process produces a dispersion comprising the functionalized solid particles dispersed in the solvent.

27. The process of clause 26, further comprising separating the functionalized solid particles from the solvent.

28. The process of clause 27, wherein separating the functionalized solid particles from the solvent comprises evaporating the solvent.

29. Use of a 1,1-di-activated vinyl compound, or a multifunctional form thereof, or a combination thereof as described in any of clauses 11-16 to improve the dispersibility of solid particles, wherein the dispersibility is improved in comparison to the same solid particles not comprising a 1,1-di-activated vinyl compound, or a multifunctional form thereof, or a combination thereof, or a readtion product of any of these.

30. An article coated with the coating composition of clause 20.

31. An article of clause 30, wherein the article is a free-standing structure and/or a mobile-entity.

32. An article of clause 31 wherein the free-standing article is an industrial component, an industrial substrate, a building, a bridge, a package, wood, apparel, glass, a transperancy, sports equipment, an appliance, a device or a piece of furniture.

33. An article in clause 31 wherein the mobile entity is an automobile, airplane, helicopter, train, ship, boat or submersible and/or components of the same.

Various features and characteristics are described in this specification to provide an understanding of the composition, structure, production, function, and/or operation of the invention, which includes the disclosed compositions, dispersions, coatings, and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including)

the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a composition, coating, or process that "comprises," "has," "includes," or "contains" one or more features and/or characteristics possesses those one or more features and/or characteristics, but is not limited to possessing only those one or more features and/or characteristics. Likewise, an element of a composition, coating, or process that "comprises," "has," "includes," or "contains" one or more features and/or characteristics possesses those one or more features and/or characteristics, but is not limited to possessing only those one or more features and/or characteristics, and can possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A particle composition comprising:
    a solid core particle comprising an outer surface; and
    a functionalizing layer over at least a portion of the outer surface of the solid core particle;
    wherein the functionalizing layer comprises a reaction product of a 1,1-di-activated vinyl compound, or a multifunctional form thereof, or a combination thereof and the 1,1-diactivated vinyl compound comprises a methylene dicarbonyl compound, wherein the functionalizing layer comprises a bond between the solid core particle and the 1,1-di-actived compound, or multifunctional form thereof, or combination thereof.

2. The particle composition of claim 1, wherein the functionalizing layer comprises:
    a bond between the solid core particle and the 1,1-di-activated vinyl compound, or multifunctional form thereof, or combination thereof; and/or
    a polymerization reaction product of the 1,1-di-activated vinyl compound, or multifunctional form thereof, or combination thereof, physically and/or chemically adsorbed onto the surface of the solid core particle.

3. The particle composition of claim 1, wherein the solid core particle comprises clay, mica, talc, a zeolite, carbon black, or an oxide, sulfide, sulfate, selenide, arsenide, cyanide, cyanate, halide, carbonate, hydroxide, nitrate, nitride, coordination complex, or organometallic complex of a transition element or p-block element, or a combination of any thereof.

4. The particle composition of claim 3, wherein the solid core particle comprises an oxide, sulfide, sulfate, selenide, arsenide, cyanide, cyanate, halide, carbonate, hydroxide, nitrate, nitride, coordination complex, or organometallic complex of an element comprising copper, aluminum, cobalt, manganese, iron, cadmium, arsenic, chromium, lead, titanium, tin, antimony, zinc, barium, indium, or mercury, or a combination of any thereof.

5. The particle composition of claim 3, wherein the solid core particle comprises a metal oxide particle.

6. The particle composition of claim 5, wherein the solid core particle comprises titanium dioxide, zirconium dioxide, zinc oxide, magnesium oxide, an iron oxide, a chromium oxide, silicon dioxide, or an aluminum oxide, or a combination of any thereof.

7. The particle composition of claim 6, wherein the solid core particle comprises titanium dioxide.

8. The particle composition of claim 7, wherein the solid core particle comprises a titanium dioxide particle comprising an outer coating comprising zirconium dioxide and/or an aluminum oxide, and wherein the functionalizing layer is located over at least a portion of the outer surface of the outer coating.

9. The particle composition of claim 1, wherein the solid core particle comprises a metal particle, an alloy particle, a glass particle, or a thermoplastic particle.

10. The particle composition of claim 9, wherein the 1,1-di-activated vinyl compound comprises:
   a dialkyl methylene malonate;
   a diaryl methylene malonate;
   a multifunctional form of a dialkyl methylene malonate; or
   a multifunctional form of a diaryl methylene malonate; or
   a combination of any thereof.

11. The particle composition of claim 10, wherein the 1,1-di-activated vinyl compound comprises:
   diethyl methylene malonate;
   a multifunctional form of diethyl methylene malonate comprising a transesterification adduct of diethyl methylene malonate and at least one polyol;
   dimethyl methylene malonate; or
   a multifunctional form of dimethyl methylene malonate comprising a transesterification adduct of dimethyl methylene malonate and at least one polyol; or a combination of any thereof.

12. The particle composition of claim 11, wherein the 1,1-di-activated vinyl compound comprises a transesterification adduct of diethyl methylene malonate and a diol.

13. The particle composition of claim 1, wherein the solid core particle comprises an organic pigment particle.

14. A dispersion comprising:
   a solvent; and
   the particle composition of claim 1 dispersed in the solvent.

15. A coating composition comprising:
   a solvent,
   a film-forming resin dispersed in the solvent; and
   the particle composition of claim 1 dispersed in the solvent.

16. The coating composition of claim 15, wherein the film-forming resin comprises an epoxy polymer, acrylic polymer, polyurethane polymer, polyurea polymer, polyester polymer, polyether polymer, polythioether polymer, polyamide polymer, polycarbonate polymer, polycarbamate polymer, polysiloxane polymer, phenolic resin, or aminoplast resin, or a combination of any thereof.

17. The coating composition of claim 15, wherein the film-forming resin comprises a polymeric film-forming resin comprising pendant and/or terminal functional groups comprising carboxylic acid groups, amine groups, epoxide groups, hydroxyl groups, silanol groups, silicon-hydride groups, thiol groups, carbamate groups, amide groups, urea groups, or isocyanate groups (blocked or unblocked), or a combination of any thereof.

18. An article coated with the coating composition of claim 15.

19. The article of claim 18, wherein the article is a free-standing structure and/or a mobile-entity.

20. The article of claim 19 wherein the free-standing article is an industrial component, an industrial substrate, a building, a bridge, a package, wood, apparel, glass, a transparency, sports equipment, an appliance, a device or a piece of furniture.

21. A process for producing the particle composition of claim 1, the process comprising:
   mixing the solid particles in a solvent to form a mixture;
   adding the 1,1-di-activated vinyl compound, or a multifunctional form thereof, or a combination thereof, to the mixture; and
   reacting the 1,1-di-activated vinyl compound, or a multifunctional form thereof, or a combination thereof, in the mixture;
   wherein the reaction forms a functionalizing layer over at least a portion of an outer surface of the solid particles, the functionalizing layer comprising a reaction product of the 1,1-di-activated vinyl compound, or a multifunctional form thereof, or a combination thereof.

22. The process of claim 21, wherein the process produces a dispersion comprising the functionalized solid particles dispersed in the solvent.

23. The process of claim 22, further comprising separating the functionalized solid particles from the solvent.

* * * * *